Jan. 10, 1950          R. C. F. BRAINARD          2,493,854
                         CULINARY IMPLEMENT
                        Filed May 19, 1947
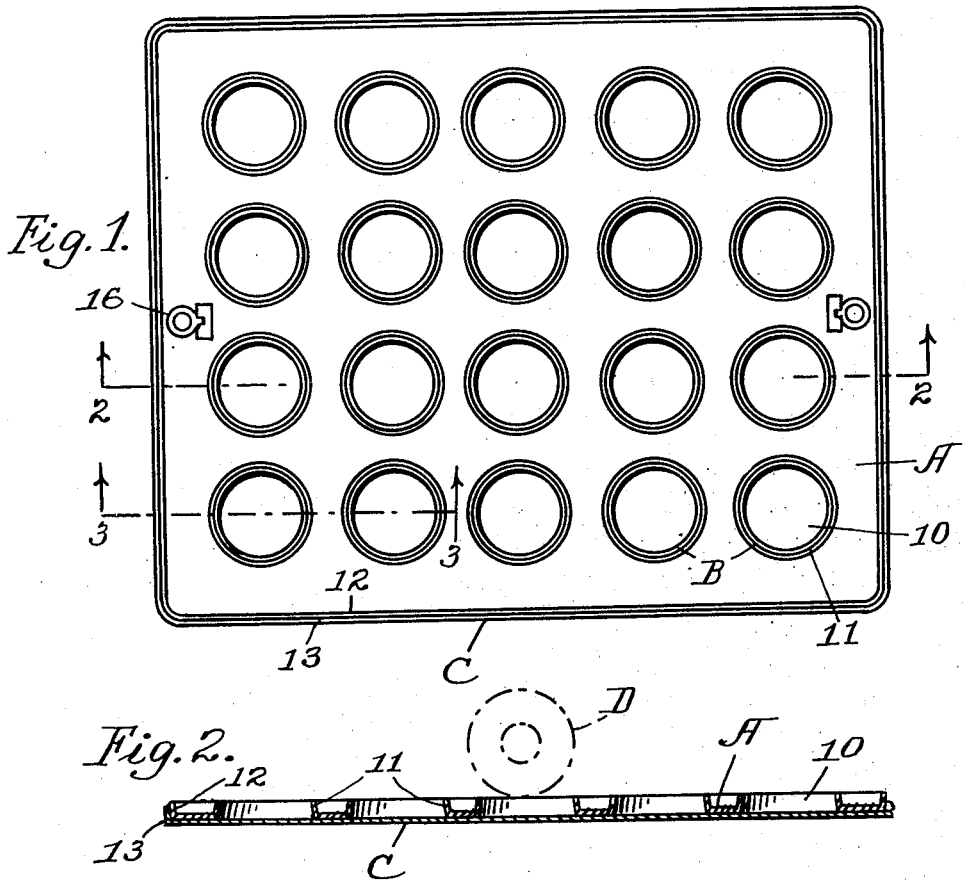
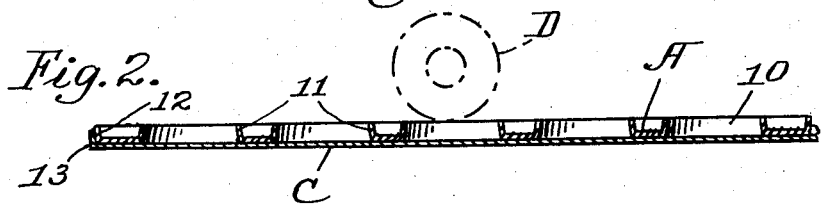
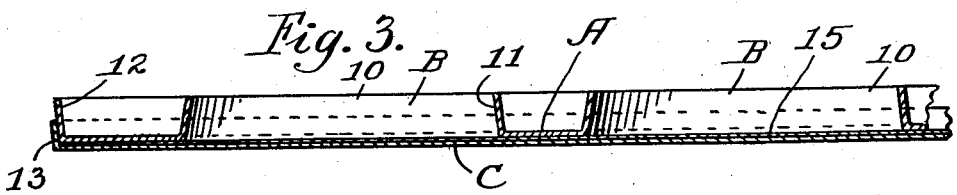
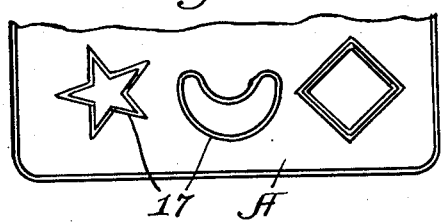
Ruby Clara Frederica Brainard
by: *N. G. Bradbury*
Attorney.

Patented Jan. 10, 1950

2,493,854

UNITED STATES PATENT OFFICE 2,493,854

CULINARY IMPLEMENT

Ruby Clara Frederica Brainard, Altadena, Calif.

Application May 19, 1947, Serial No. 748,951

1 Claim. (Cl. 107—19)

This invention, a continuation in part of my co-pending application, Serial No. 593,859 filed May 15, 1945, now abandoned, relates to a culinary implement which is used for the simultaneous preparation of a number of cookies, cakes, biscuits, hamburgers and other articles. More particularly my invention relates to that type of culinary implement which is adapted for use by hand for preparing and baking a batch of pastry or other articles. The primary object is to provide a hand operable forming implement which is adapted to simultaneously mold a plurality of pastry or other articles of any desired shape and even thickness and having smooth marginal edges, without sticking to mold surfaces. Among further objects is to shorten the time for producing and to facilitate and simplify the means for the production of pastry or other articles for household service.

By the use of my improved means it is not necessary to roll batter on a bread board and cut out individual pastry articles and then place the articles which are cut on an oven baking plate. Also the articles are cooperatively supported on a supporting plate by a thin flexible sheet of metal foil which will withstand the heat of baking and prevent sticking and by which an entire batch of pastry or other articles can be removed from the supporting plate without handling the individual articles, thus saving time and promoting cleanliness.

In the drawing, Fig. 1 is a plan of my improved culinary implement in assembled form ready to receive dough or other material from which articles are formed; Fig. 2 is a cross section of a detail taken on the line 2—2 of Fig. 1; Fig. 3 is a cross section of a detail taken on the line 3—3 of Fig. 1, at increased scale; and Fig. 4 is a plan of a portion of a mold plate illustrating a number of alternative designs of molds which may be used with my invention.

In the drawing, A represents a mold plate which is made out of a thin flat sheet of metal or other suitable material and of rectangular or other marginal configuration. The mold plate as shown is provided with a plurality of molds B, which are disposed in longitudinal and transverse rows as shown in Fig. 1, or in any other arrangement desired. Each mold is formed with a mold cavity or matrix 10, having an upturned marginal reinforcing edge 11 of any suitable shape and the upper edges of all of the molds being of even and suitable height to mold cookies, cakes, biscuits or other articles from dough or other material, of any desired thickness, and to produce pastry or other articles of any desired shape. The marginal edges 10 of the molds which are of even height, taper upwardly and inwardly to provide clearance when the mold plate is separated by lifting from the molded articles. The mold plate is formed with an upturned reinforcing marginal edge 12 of corresponding height as that of the marginal sides 11 of the molds for the purposes hereinafter described.

A suitable flat oven baking or supporting plate C is provided below the mold plate, said baking or supporting plate being composed of a thin sheet of metal or other suitable material, of a shape and size substantially conforming with the mold plate A and provided with a substantially rectangular or other suitable shaped upturned marginal reinforcing edge 13 which acts as a shallow socket in which the mold plate is adapted to be securely held and forming the bottoms of the molds during the molding operation of the pastry or other articles. The marginal upturned edge 13 flares slightly outwardly to provide free clearance so that the mold plate will nest closely and immovably above the surface of plate C and said plates can be easily separated.

A thin sheet of metal foil 15 may when desired be placed between the upper and lower plates A and C. The metal foil may be composed of aluminum or other suitable material which will withstand the heat of baking without depreciating. It cooperates with the baking or supporting plates and the mold plate to prevent sticking of the two upper and lower surfaces thereof. It also cooperates with the baking plate in providing a surface of maximum smoothness in the bottom of each mold cavity for the pastry or other articles. It further cooperates with the pastry articles whereby all of them may be simultaneously removed from the baking or supporting plate without hand contact which is a distinct advantage from the standpoint of cleanliness.

Clips 16 on the mold plate A are adapted to assist the user in lifting the mold plate off of the oven baking or supporting plate C.

In use, first the sheet of metal foil is spread flat upon the surface of the baking or supporting plate, then the mold plate is placed on the surface of the metal foil while engaged by the upturned marginal edges of the baking or supporting plate. A pellet of pastry dough or other material of suitable size and consistency is next placed in each mold cavity of the mold plate and the material pressed into each of the molds by rolling thoroughly with a rolling pin D as indicated by broken lines in Fig. 2. When rolling the roller pin shears off excess batter or material around each article. Any excess batter or material cut or squeezed out of the molds is retained on the surface of the mold plate and can be removed. The mold plate is next lifted or stripped off of the baking or supporting plate bearing the batch of molded articles deposited on the sheet of metal foil. The baking or supporting plate is next placed in an oven and after the baking operation removed. The cookies or other articles can then be removed by the metal foil without sticking. Instead of using the baking plate in the oven for baking the molded articles, the latter, if desired while in unbaked condition can be transferred onto a separate baking plate by the use of the metal foil. In this manner plate C is made available for immediate use in molding a successive batch of articles.

It is understood that the complete device can be used effectively in substantially the same manner as described without using the metal foil, also that the molds may be of any desired configuration, the shape shown in Figs. 1 to 3 being circular. In Fig. 4 several alternative shapes of molds 17 are shown in a portion of the mold plate A.

Modifications are contemplated within the spirit of the invention and the scope of the following claim.

I claim:

A culinary implement, comprising a thin substantially flat mold plate having a plurality of mold matrices therein, each of said matrices being formed by an opening through said plate and an upturned marginal flange tapering outwardly around said matrix above the plate, said flanges around said matrices being of even height above the mold plate, a mold board for supporting the mold plate with the enlarged portions of the matrices downwardly, and a transfer sheet placed between the mold board and said mold plate by which all of the molded articles can be shifted simultaneously off of the mold board when the mold plate has been stripped from the molded articles.

RUBY CLARA FREDERICA BRAINARD.

REFERENCES CITED

The following references are of record in the file of this patent:

UNITED STATES PATENTS

| Number | Name | Date |
| --- | --- | --- |
| 139,217 | Webster | May 20, 1873 |
| 634,003 | Kellogg | Oct. 3, 1899 |
| 692,323 | Marine | Feb. 4, 1902 |
| 776,777 | Dietz | Dec. 6, 1904 |
| 825,849 | Lohmann | July 10, 1906 |
| 1,184,342 | Govan et al. | May 23, 1916 |
| 1,757,447 | Comstock | May 6, 1930 |
| 2,081,080 | Baker | May 18, 1937 |
| 2,088,069 | Soude | July 27, 1937 |